United States Patent
Stephens et al.

(10) Patent No.: US 9,832,052 B2
(45) Date of Patent: Nov. 28, 2017

(54) MOBILE COMMUNICATIONS SYSTEM

(71) Applicant: SEPURA PLC, Cambridge (GB)

(72) Inventors: Peter Stephens, Cambridge (GB); Paul Nodar, Cambridge (GB)

(73) Assignee: SEPURA PLC, Cambridge (GB)

( * ) Notice: Subject to any disclaimer, the term of this patent is extended or adjusted under 35 U.S.C. 154(b) by 30 days.

(21) Appl. No.: 14/767,289

(22) PCT Filed: Feb. 12, 2014

(86) PCT No.: PCT/GB2014/050399
§ 371 (c)(1),
(2) Date: Aug. 12, 2015

(87) PCT Pub. No.: WO2014/125265
PCT Pub. Date: Aug. 21, 2014

(65) Prior Publication Data
US 2016/0006588 A1    Jan. 7, 2016

(30) Foreign Application Priority Data
Feb. 12, 2013 (GB) .................................... 1302414.6

(51) Int. Cl.
*H04L 27/00* (2006.01)
*H04L 27/18* (2006.01)
(Continued)

(52) U.S. Cl.
CPC ............ *H04L 27/0008* (2013.01); *H04L 5/22* (2013.01); *H04L 27/18* (2013.01); *H04L 27/2602* (2013.01)

(58) Field of Classification Search
None
See application file for complete search history.

(56) References Cited

U.S. PATENT DOCUMENTS 6,014,375 A   1/2000   Janky
6,424,678 B1   7/2002   Doberstein
(Continued)

FOREIGN PATENT DOCUMENTS

EP    1168700    5/2007
GB    2407951    11/2005
(Continued)

OTHER PUBLICATIONS

Mehdi "TEDS: A High Speed Digital Mobile Communication Air Interface for Professional Users", Dec. 2006, submitted as prior art by the applicant.*
(Continued)

*Primary Examiner* — Andrew Lai
*Assistant Examiner* — Jamaal Henson
(74) *Attorney, Agent, or Firm* — Vierra Magen Marcus LLP

(57) ABSTRACT

A modulation scheme for use in a digital mobile radio communications system. The modulation scheme uses a four slot time-division multiple access scheme with 12.5 kHz channels. Each 12.5 kHz channel contains plural sub-carriers and each sub-carrier is modulated with a modulation scheme that encodes at least 4 bits per symbol. The modulation scheme can be used in a standalone mobile radio communications system, or in a hybrid mobile radio communications system that also uses standard TETRA modulation schemes.

24 Claims, 7 Drawing Sheets

(51) Int. Cl.
   *H04L 27/26* (2006.01)
   *H04L 5/22* (2006.01)

(56) References Cited

U.S. PATENT DOCUMENTS

| | | | |
|---|---|---|---|
| 7,133,421 | B1 | 11/2006 | Puhakainen et al. |
| 7,995,455 | B1 | 8/2011 | Narasimhan |
| 2002/0002050 | A1 | 1/2002 | Rinne |
| 2002/0009101 | A1 | 1/2002 | Niemela |
| 2005/0195769 | A1 | 9/2005 | Kaewell |
| 2009/0067542 | A1* | 3/2009 | Haartsen ........... H03M 13/3761 375/298 |
| 2012/0087354 | A1* | 4/2012 | LoGalbo ............... H04B 7/022 370/337 |
| 2012/0165060 | A1 | 6/2012 | Klemettinen |
| 2012/0327871 | A1 | 12/2012 | Ghosh |
| 2014/0194154 | A1 | 7/2014 | Sridhara |

FOREIGN PATENT DOCUMENTS

| | | |
|---|---|---|
| GB | 2510718 | 8/2014 |
| WO | 2005/048551 | 5/2005 |
| WO | 2011066514 | 6/2011 |
| WO | 2014125265 | 8/2014 |

OTHER PUBLICATIONS

Response to Office Action dated May 6, 2016, U.S. Appl. No. 14/767,288.

Notice of Allowance dated May 23, 2016, U.S. Appl. No. 14/767,288.

PCT International Search Report and Written Opinion of the International Searching Authority, dated May 23, 2014, PCT/GB2014/050398.

PCT Written Opinion of the International Preliminary Examining Authority, dated Feb. 3, 2015, PCT/GB2014/050398.

GB1402410.3 Combined Search and Examination Report dated May 27, 2014.

PCT International Search Report and Written Opinion of the International Searching Authority, dated May 8, 2014, PCT/GB2014/050399.

PCT International Preliminary Examination Report dated Jun. 12, 2015, PCT/GB2014/050399.

PCT Written Opinion of the International Preliminary Examining Authority dated May 8, 2015, PCT/GB2014/050399.

GB1402416.0 Combined Search and Examination Report dated Nov. 6, 2014.

Tse, et al., "Fundamentals of Wireless Communication; Chapter 3: Point-to-point communication: detection, diversity, and channel uncertainty", Dec. 31, 2005, pp. 49-119, XP055164655.

Nouri, "TEDS: A high speed digital mobile communication air interface for professional users," IEEE Vehicular Technology Magazine, IEEE, US, vol. 1, No. 4, Dec. 1, 2006.

"Terrestrial Trunked Radio (TETRA); Voice plus Data (V+D); Part 2: Air Interface (AI); 03206v343", ETSI Draft ; 03206V343, European Telecommunications Standards Institute France vol. TCCE No. V3.4.3, Aug. 10, 2011.

Navarro, et al., "Practical Non-Uniform Channelization for Multistandard Base Station", ZTE: communications, vol. 9, No. 4, Dec. 1, 2011, pp. 15-24, XP055164427.

Navalekar, "Distributed Digital Radios for Land Mobile Radio Applications," PhD dissertation—Worcester Polytechnic Institute, Dec. 22, 2009, pp. 1-116, XP055183648, https://www.wpi.edu/Pubs/ETD/Available/etd-010410-135413/unrestricted/navialekar.pdf.

System Proposal for a 6.25 kHz FDMA Radio Subsystem for V+D (TETRA 6), European Telecommunications Standards Institute, TETRA 6 version 0.0.1, Feb. 22, 1994.

"Electromagnetic compatibility and Radio spectrum Matters; Digital Mobile Radio (DMR) Systems; Part 1: DMR Air Interface (AI) protocol, ETSI TS 102 361-1 v1.4.5, Dec. 2007 http://www.etsi.org/deliver/etsi_ts/102300_102399/10236101/01.04.05_60/ts_10236101v010405p.pdf".

"Electromagnetic compatibility and Radio spectrum Matters (ERM); Peer-to-Peer Digital Private Mobile Radio using DFDMA with a channel spacing of 6,25 kHz with e.r.p. of up to 500 mW, ETSI TS 102 490 V1.3.1, Apr. 2007 http://www.etsi.org/deliver/etsi_ts/102400_102499/102490/01.03.01_60/ts_102490v010301p.pdr".

U.S. Appl. No. 14/767,288, filed Aug. 12, 2015, titled Mobile Communications System.

Office Action dated Feb. 26, 2016, U.S. Appl. No. 14/767,288.

GB Office Action dated Dec. 8, 2016, GB Patent Application No. GB14707206.0.

ETSI: "Terrestrial Trunked Radio (TETRA); User Requirement Specification TETRA Release 2.1; Part 12: Direct Mode Operation (DMO)", Aug. 31, 2012 (Aug. 31, 2012), pp. 1-13, XP055324331, Retrieved from the Internet: URL:http://www.etsi.org/deliver/etsi_tr/102000_102099/10202112/01.01.01_60/tr_10202112v010101p.pdf, [retrieved on Nov. 29, 2016].

* cited by examiner

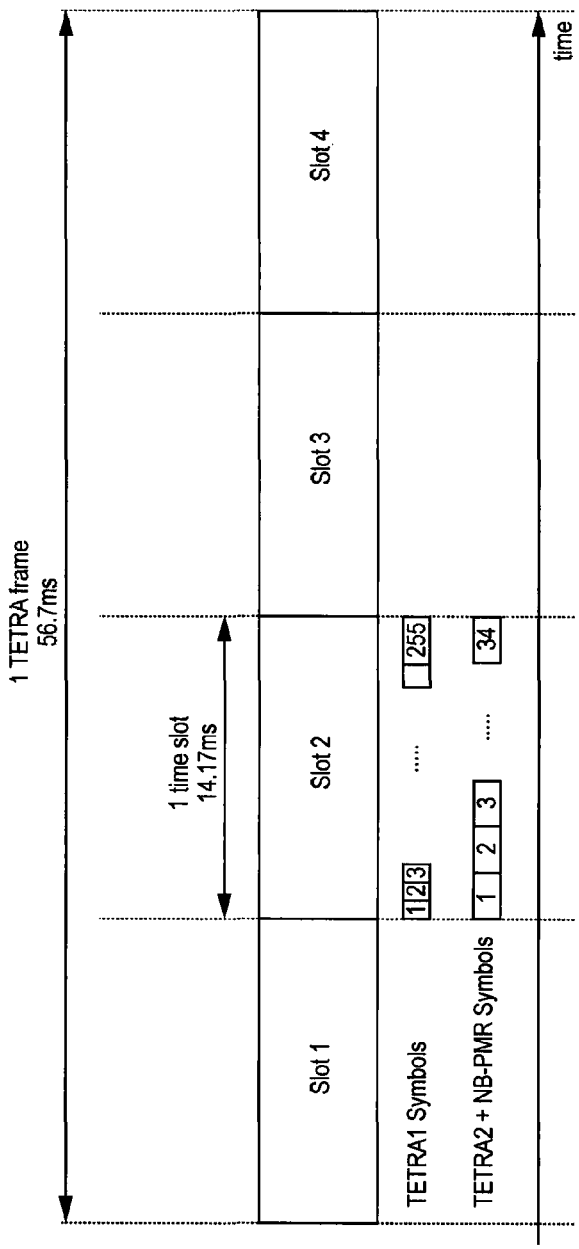

FIG. 7 Downlink Synchronisation NB-PMR burst

FIG. 8 Direct mode sync NB-PMR burst

MOBILE COMMUNICATIONS SYSTEM

The present application is a Section 371 National Stage Application of International Application No. PCT/GB2014/050399, filed on 12 Feb. 2014, which claims the benefit of GB1302414.6, filed on 12 Feb. 2013, the entire disclosure of which are incorporated herein by reference in its entirety.

The present invention relates to mobile communications systems, and in particular to digital mobile radio communications systems, such as the TETRA (TErrestrial TRunked RAdio) system.

Mobile radio communications systems typically use predefined frequency channels to carry signalling and traffic. The arrangement of the frequency channels, for example the frequency bandwidth of each channel, is usually specified in the telecommunications Standard with which the communications system complies, and all signalling and traffic transmitted in the system must be arranged in accordance with the defined frequency channel arrangement.

The way that the radio spectrum is allowed to be divided into frequency channels will also normally be specified by the relevant regulatory authorities. For example, in some countries and/or frequency bands, the radio frequencies available for mobile radio communication systems are divided into (allocated in) 25 kHz channels, while in other countries and/or frequency bands, the available radio frequencies are divided into 12.5 kHz channels.

Accordingly, a number of modern digital mobile radio communication systems are configured to use 25 kHz channels, and other systems are configured to use 12.5 kHz channels. For example, the TETRA (TETRA 1) system uses 25 kHz channels, while the DMR (Digital Mobile Radio) and P25 (Project 25 or APCO-25) systems use 12.5 kHz channels, and the dPMR (Digital Private Mobile Radio) system operates in a Frequency Division Multiple Access (FDMA) scheme using two 6.25 kHz channels.

There is also a recent extension to the TETRA Standard known as TETRA Release 2 (TETRA2 or TEDS) that is intended to provide higher data rates for packet data. The TEDS Standard defines a system which can operate with channels having bandwidths between 25 kHz and 150 kHz (in particular 25 kHz, 50 kHz, 100 kHz and 150 kHz).

A mobile radio communications system intended for use with a particular frequency channel arrangement will usually be optimised for that frequency channel arrangement. It will therefore not normally be, and not be expected to be, readily suitable for use with a second, different frequency channel arrangement, because it would generate transmissions which are not appropriate for the other frequency channel arrangement.

This may not be a problem where communications systems are intended to be self-contained and not intended to interoperate with other systems. However, the Applicants have recognised that it may be desirable for radio systems to be able to operate in regions that use different frequency channel arrangements. For example, it may be desired to introduce a newer radio system (that would normally operate with a particular frequency channel arrangement) into a region where the permitted frequency channel arrangement is different. For example, with regard to the TETRA system, it may be desirable to introduce radio systems offering TETRA services into parts of the world where the radio spectrum is divided into 12.5 kHz channels. In such instances, it would not be possible to use existing TETRA systems, which operate using 25 kHz channels.

Another consideration for existing communications systems, is that over a period of time enhancements may be desirable. This could be, for example, for reasons of system capacity (e.g. because the number of users wishing to use the system has increased), or because communications applications requiring higher data rates need to be supported by the system. In such cases it may be desired to make more efficient use of the spectrum available for operation of the communications system, since radio spectrum is a scarce resource.

However, this may not be readily possible with existing mobile communications systems. For example, with regard to the existing TETRA (TETRA 1) system, each 25 kHz channel supports four users in a four slot Time Division Multiple Access (TDMA) scheme. Accordingly, the system requires the equivalent of 6.25 kHz bandwidth per voice channel, and this is the most efficient use that TETRA 1 compliant systems can make of the radio spectrum.

The existing digital mobile radio systems that operate with 12.5 kHz channels (e.g. DMR, P25, as discussed above) also generally require at least 6.25 kHz equivalent bandwidth per voice channel. For example, "Phase 1" P25 is a mixed analogue/digital system that operates with 12.5 kHz channels using FDMA. "Phase 2" P25 uses a two slot TDMA scheme. The DMR system operates with 12.5 kHz channels using a two slot TDMA scheme and the dPMR system operates an FDMA scheme with two 6.25 kHz channels. Thus, these systems at best offer only the same spectral efficiency as TETRA (TETRA 1). Furthermore, these systems generally have reduced functionality compared to the TETRA (TETRA 1) system, and are not compatible with nor interoperable with the TETRA system.

The Applicants believe therefore that there remains a need to be able to provide reduced bandwidth/higher spectral efficiency digital mobile radio communications systems.

According to a first aspect of the present invention, there is provided a method of operating a digital mobile radio communications system, comprising:

using a four slot time-division multiple access scheme in 12.5 kHz channels, with each 12.5 kHz channel containing plural sub-carriers and each sub-carrier being modulated with a modulation scheme that encodes at least 4 bits per symbol, for transmissions in the system.

According to a second aspect of the present invention, there is provided a communications terminal for a digital mobile radio communications system, comprising:

means for making transmissions using a four slot time-division multiple access scheme in 12.5 kHz channels, with each 12.5 kHz channel containing plural sub-carriers and each sub-carrier being modulated with a modulation scheme that encodes at least 4 bits per symbol.

According to a third aspect of the present invention, there is provided a digital mobile radio communications system, comprising:

means for making transmissions using a four slot time-division multiple access scheme in 12.5 kHz channels, with each 12.5 kHz channel containing plural sub-carriers and each sub-carrier being modulated with a modulation scheme that encodes at least 4 bits per symbol.

The present invention provides a digital mobile communications system that operates in 12.5 kHz channels, using a 4-slot TDMA arrangement and a particular form of modulation scheme for its transmissions. As will be discussed further below, this system can operate with an effective 3.125 kHz equivalent channel width per user, thereby using the radio spectrum more efficiently (providing increased capacity). Moreover, the system can, again as will be discussed further below, provide a high degree of compatibility with existing TETRA 1 systems, thereby allowing interoperability with and in existing TETRA 1 systems, and the functionality of TETRA 1 to be supported by this new mobile communications system. For example, as will be discussed further below, the system of the present invention, in its preferred embodiments at least, can still use the TETRA 1 slot and frame structure (i.e. 4 timeslots per frame, eighteen frames per-multiframe, slot and frame durations, etc.), and when doing so provide and support data rates and timeslot payload capacities that are compatible with and correspond to TETRA 1.

Thus, the present invention can provide a higher capacity (more radio spectrum efficient) communications system, that can operate in narrower frequency bands than existing TETRA systems, while still being able to remain compatible with many aspects of existing TETRA systems, such as the TETRA transmission format and structure, and support a comprehensive set of TETRA functions and services. The present invention can accordingly be used, for example, to provide a narrow band digital mobile radio communications system operating in 12.5 kHz channels that has a high degree of compatibility with existing TETRA systems.

The enhanced communications system and scheme of the present invention can also accordingly be used in and with existing TETRA (for example) communications networks and equipment, without the need for substantial modifications and changes to that equipment, and without the need for significant investment in new equipment. This is particularly true for more modern TETRA communications systems that are able to support both TETRA 1 and TEDS functionalities.

Thus the scheme of the present invention can be used to upgrade an existing TETRA system in a way which requires no new frequencies and requires relatively minimal new equipment investment. Similarly, the invention can be employed in green field TETRA systems to enhance the basic TETRA system capability. It can also be used to allow a substantially TETRA compatible and/or TETRA-based system to be deployed in regions and frequency bands that specify 12.5 kHz, rather than 25 kHz, radio channels.

The present invention can thus effectively provide a "narrow band" mobile communications system, that can, for example, in particular, be used in and with TETRA systems and TETRA equipment, and can support TETRA services.

It should be noted here that the present invention does not simply use the existing TETRA (TETRA 1) system but halve the bandwidth of the filter (i.e. simply halve the channel bandwidth). This is because although this would provide an appropriately narrow channel bandwidth, the Applicants have recognised that such a scheme would result in severe distortion of the modulated signal. Similarly, while one could in order to address the above problems with distortion, in principle simply halve the modulation rate of the signal (i.e. double the symbol period), the Applicants have recognised that in that case the bit rate of the system would then be halved, and the system would then at best comprise a two slot TDMA scheme, thereby not fully preserving the TETRA 1 functionality, nor increasing the spectral efficiency over TETRA 1.

To address this, the present invention uses, for information-carrying symbols such as the header and/or payload (data) symbols, at least, a higher level modulation scheme that encodes more (and at least 4) bits per symbol. This then allows longer symbol periods to be used, whilst still achieving a given bit rate. However, the present invention does not simply use any form of higher level modulation scheme, but uses multi-sub-carriers with a higher level modulation scheme. This is because the Applicants have recognised that using a single carrier with a higher level modulation scheme would still require relatively high symbol rates, but at higher symbol rates may not perform well in fading channels due to multipath distortion. The present invention avoids this by using multi-sub-carriers with a higher level modulation scheme, as by using a multi-sub-carrier arrangement, the symbol rate for each individual sub-carrier can be relatively lower (and thus the symbol duration can be relatively longer).

The communications station of the present invention may be a mobile station or a base station, as is known in the art. In one preferred embodiment it is a base station. In another preferred embodiment it is a mobile station.

The present invention uses a four-slot TDMA arrangement. While any suitable and desired such arrangement can be used in the present invention, in a particularly preferred embodiment, a 4-slot TDMA time slot and frame structure having the timings (the timing structure) of TETRA 1 (and thus TEDS) is used. Thus, in a preferred embodiment, the system of the present invention uses frames of 4-timeslots and multiframes of 18 frames. Preferably each time-slot is 14.17 ms long, and each frame is 56.7 ms long. This facilitates compatibility with TETRA 1 and TEDS systems.

Each timeslot preferably contains a given (and the same) number of symbols per sub-carrier. Preferably the number of symbols per-sub-carrier per timeslot is even, as that then facilitates the transmission of half-slots, and therefore compatibility with TETRA 1. Where, as will be discussed further below, the modulation scheme of the present invention encodes 4 bits per symbol, each timeslot preferably contains 34 such symbols per-sub-carrier. As will be discussed further below, this then means that with timeslots corresponding to the TETRA 1 timing structure, the scheme of the present invention can support a timeslot payload bit capacity (bit rate) that is compatible with existing TETRA systems, protocols and equipment.

Each 12.5 kHz channel that is used in the present invention may be divided into the requisite multiple sub-carriers (sub-channels) in any desired and suitable manner. Most preferably, the sub-carriers (sub-channels) are equally spaced within the channel. Any (plural) number of sub-carriers can be used. Preferably not more than eight sub-carriers are used. In a particularly preferred embodiment, four sub-carriers are used. This has been found to facilitate the use of longer symbols, thereby making the signal more robust in mobile fading propagation channels, but without making the symbols so long that other problems such as excessive latency waiting for symbols to arrive then arise. In a preferred such embodiment, a sub-carrier spacing of 2.7 kHz is used in each 12.5 kHz channel. In other embodiments, two, six, or eight sub-carriers can be used. The system may use only a single 12.5 kHz channel, but as will be appreciated by those skilled in the art, plural 12.5 kHz channels are preferably provided (supported) and used.

The modulation scheme that is used in the present invention can be any desired and suitable modulation scheme that encodes at least four bits per symbol. Suitable modulation schemes include QAM, PSK/DPSK, or OFDM schemes. Each sub-carrier should be and is preferably modulated using the same modulation scheme.

In a particularly preferred embodiment, 16-QAM is used. This encodes 4-bits per-symbol, and thus when used in a timeslot having the TETRA 1 timing structure that can contain 34 symbols per sub-carrier per timeslot, will provide 4×34=136 bits per sub-carrier per timeslot, and so can be used to provide 544 bits (4×136) per timeslot where 4 sub-carriers (each carrying 34 16-QAM symbols) are being used. As will be discussed further below, this bit capacity can be used to provide a system that is compatible with TETRA.

In a preferred embodiment, the modulation scheme of the present invention uses 2400 symbols per second, sub-carrier spacing of 2.7 kHz, and an RRC modulation filter with alpha=0.2. In this case, the nominal overall modulation bandwidth (for a frequency channel) will be 10.8 kHz. This has the effect that the modulation scheme will then generally (apart from the number of sub-carriers) correspond to and be compatible with the modulation scheme that is used in TEDS.

The 4-bit per symbol modulation scheme, such as 16-QAM, should be, and preferably is, used for the information-carrying symbols, such as header and payload (data) symbols in each burst. However, other symbols in a burst, such as pilot and synchronisation symbols, need not use the 4-bit per symbol modulation scheme, and may, e.g. have their own particular symbol constellations. Thus, the requirement is that at least some data (payload) symbols on a sub-carrier are encoded using a 4-bit per symbol modulation scheme.

The present invention preferably uses particular (and identifiable) burst structures for its transmissions (as is conventional in mobile communications systems), so as to, e.g., allow particular forms (types) of transmissions to be readily identified and processed.

While it would be possible to define and use any desired and suitable set of burst types for this purpose, in a particularly preferred embodiment, burst types that correspond to burst types that are used in TETRA 1 are preferably used. This facilitates compatibility with TETRA 1.

Thus, in a preferred embodiment, the system of the present invention supports and uses one or more of, and preferably all of the following burst types: normal uplink burst; normal downlink burst; control uplink burst; and downlink synchronisation bursts.

In a preferred embodiment, unlike for TETRA 1, the system of the present invention does not use (nor support) discontinuous downlink bursts. In this regard, the Applicants have recognised that it is not necessary to provide the facility to transmit discontinuous downlink bursts. This is because discontinuous downlink bursts solely serve to provide ramp up and ramp down periods for base stations, but the Applicants have realised that in practice this functionality is not generally needed, so these bursts can be omitted, thereby simplifying the burst types to be used.

Furthermore, the Applicants have recognised that it would in fact be advantageous to operate the system without using discontinuous downlink bursts (i.e. using continuous downlink bursts (only)), since the concatenation of slots in the continuous downlink bursts will allow (a mobile station of) the system to use some of the synchronisation and pilot symbols from the current (its own) and from the next (or previous) slot for synchronisation and equalisation purposes. This then means that fewer synchronisation and pilot symbols need to be provided in each slot (each burst), so that more symbols in a given burst can be used as data symbols, thereby providing an increased useful payload capacity in each timeslot.

In another embodiment, ramp down periods, preferably periodic ramp down periods, are provided. In this embodiment, the system of the present invention preferably uses (supports) a dedicated ramp down burst. This then can be used for linearization of base stations.

In a particularly preferred embodiment, the burst types that are used in the present invention have a close correspondence to burst types used in TETRA 1, and formats (burst structures) that are similar to but modified with respect to the existing TEDS burst formats.

The Applicants have recognised in particular that it would not be possible to simply use the TEDS (TETRA 2) synchronisation and pilot symbol structures in the scheme of the present invention, as this would result in a payload which is too small for TETRA 1 compatibility. Instead, the present invention uses new pilot and synchronisation symbol arrangements that provide space for sufficient payload symbols (and still provide adequate synchronisation and equalisation performance).

In general, each burst preferably includes pilot symbols spaced to facilitate equalisation at the receiver, synchronisation symbols to facilitate frame and symbol timing recovery at the receiver, and data symbols for carrying the useful payload (and any required header). The data symbols are preferably ordered regularly across and along the multiple sub-carriers in the 12.5 kHz channel. In a preferred embodiment, pilot symbols are included (used) in the outer sub-carriers in the channel only (so in the outer two, but not the inner two, sub-carriers where four sub-carriers are being used). This helps to provide more symbols for data purposes. The pilot symbols are preferably spaced (approximately) evenly in time and frequency.

In a preferred embodiment, the burst structures that are used in the present invention have relatively fewer synchronisation and/or pilot symbols with respect to the existing TEDS corresponding burst types. Most preferably, the ratio of synchronisation and pilot symbols to payload symbols is smaller in burst structures of the present invention with respect to the burst structures of existing TEDS corresponding burst types. In this regard, the Applicants have recognised that in the narrow band system of the present invention, the performance of the synchronisation is less critical to the overall performance of the system. Equally, the Applicants have recognised that it is possible to space the pilot symbols further apart with respect to the existing corresponding TEDS burst types. Thus, it is possible to reduce the proportion of synchronisation and/or pilot symbols with respect to the existing TEDS corresponding burst types, and thereby increase the proportion of symbols available for the payload (e.g. to provide a sufficient payload for TETRA 1 compatibility).

In a preferred embodiment of the present invention, the system uses a fixed constant modulation level (supports a fixed modulation level only). This then means that header symbols can be removed from the uplink bursts and/or some of the downlink symbols can be removed (with respect to the existing TEDS corresponding burst types) in the burst structures used in the present invention (these symbols are used in TEDS to indicate the modulation level being used). Again, this increases the number of symbols available for the payload.

In a preferred embodiment, for burst types which include header symbols, the header symbols are arranged to be close to pilot symbols. Most preferably, the header symbols are arranged to be adjacent in time and/or in frequency to pilot symbols. This has the advantage of reducing equalisation errors.

The preferred burst structures allow, for example, the four sub-carrier modulation scheme of the present invention having the preferred symbol duration and slot duration described above (i.e. providing a total of 136 (4×34) symbols per timeslot) (and thus a "raw" bit rate of 544 bits per timeslot) (with four bits per symbol) (on the downlink) to provide sufficient capacity to support TETRA 1 compatible payloads which require 432 bits per timeslot, and an additional 30 bits for the AACH channel on the downlink, whilst still allocating a number of symbols in each slot as synchronisation symbols and as pilot symbols in order to support synchronisation and channel equalisation, etc. (TETRA 1 provides a "raw" bit rate of 510 bits per timeslot.) (As is known in the art, synchronisation symbols are used to allow a receiver to determine the correct timing of bursts, while pilot symbols are for channel equalisation so that the information payload can be properly recovered from the modulated signal.)

(The equivalent uplink capacity, allowing for ramp-up and down periods, is 124 symbols per timeslot (i.e. 4×31 symbols per timeslot), or 496 bits per timeslot.)

The preferred burst structures of the present invention can thus be used to achieve payload capacities that are sufficient for compatibility with TETRA 1.

The present invention similarly preferably uses particular (and identifiable) logical channels for its transmissions (as is conventional in mobile communications systems), so as to, e.g., allow particular forms (types) of transmissions to be readily identified and processed.

While it would be possible to define and use any desired and suitable set of logical channels and mapping of logical channels onto bursts for this purpose, in a particularly preferred embodiment, logical channels and logical channel mappings that are based on, and that correspond to, logical channel types and mappings that are used in TETRA 1 are preferably used.

Thus, in a preferred embodiment, the system of the present invention supports and uses logical channels that are used in TETRA 1.

However, in a preferred embodiment, the AACH channel is transmitted using 16-QAM symbols, thereby reducing the number of AACH symbols that are used compared to TEDS, and no logical channel equivalent to the TEDS SICH channel on the uplink is provided, as this is not needed (since in the preferred embodiment of the present invention as described above, a fixed modulation level is used (as is known in the art, SICH is used in TEDS to dynamically indicate the modulation level)).

The system of the present invention preferably uses a layered protocol arrangement for its protocol (as is conventional in mobile communications systems). While the protocol that is used in the present invention could be configured and arranged in any desired manner, in a particularly preferred embodiment, only layer 1 (i.e. the "physical layer") and part of layer 2 (i.e. part of the "data link layer") are changed with respect to the protocol layers of the TETRA (TETRA 1) system. Most preferably, only layer 1 and the Lower MAC layers are changed. In this embodiment, protocol layers above the Lower MAC layer (i.e. the Upper MAC layer and above) are accordingly preferably the same as in TETRA 1. Thus, higher level protocol layers, services and applications are preferably unchanged with respect to TETRA 1.

This allows many or all of the functionalities of TETRA 1 to be preserved, and means that the protocol changes necessary to existing TETRA equipment for it to be able to use the modulation scheme of the present invention can be relatively small. Thus the changes necessary to existing TETRA equipment for it to be able to use the scheme of the present invention can be relatively small. Equally, the new scheme can have a high degree of interoperability with existing TETRA systems.

This is possible because, as discussed above, the present invention can, in its preferred embodiments at least, provide (and be configured as) a system that apart from at the physical layer, can be very similar to, and compatible with, existing TETRA 1 (particularly in terms of the payload bit rate that can be delivered to the higher protocol layers once signalling overhead has been removed).

In alternative embodiments, various changes to the higher level protocol layers (i.e. changes to the protocol layers above the Lower MAC layer) may be made as desired. For example, it could in some instances be advantageous to configure the system such that it has some knowledge of the particular modulation scheme or schemes supported by each mobile unit within the system, so that the mobile units can be assigned to appropriate frequency channels.

In a particularly preferred embodiment, the system of the present invention is configured to support Direct Mode Operation (DMO), i.e. direct terminal to terminal communications (not via the network infrastructure). This again helps to provide interoperability and compatibility with existing TETRA 1 systems (and the functionality of TETRA 1 systems).

Where DMO is supported, the system of the present invention preferably also has a defined direct mode synchronisation burst structure and a defined direct mode normal burst structure. In a preferred embodiment, the direct mode normal burst has the same structure as a normal uplink burst for the trunked mode operation.

The present invention may be used in and for any suitable and desired mobile communications system. Indeed, it may be used to provide a stand-alone "narrow band" mobile communications system if desired.

However, as will be appreciated from the above, the present invention is envisaged as having particular application to, and being particularly advantageous for, use with or in a TETRA mobile communications system, and/or with TETRA communications stations.

Thus, in a particularly preferred embodiment, the present invention is used in or with a TETRA mobile communications system, and the mobile communications station is a TETRA communications station (i.e. a communications station that can operate according to the TETRA standard, as well as in the manner of the present invention).

Thus, according to another aspect of the present invention, there is provided a method of operating a TETRA-compatible mobile communications system, comprising:

using a four slot time-division multiple access scheme in 12.5 kHz channels, with each 12.5 kHz channel containing plural sub-carriers and each sub-carrier being modulated with a modulation scheme that encodes at least 4 bits per symbol, for transmissions in the system.

According to another aspect of the present invention, there is provided a communications terminal for a TETRA-compatible mobile communications system, comprising:

means for making transmissions using a four slot time-division multiple access scheme in 12.5 kHz channels, with each 12.5 kHz channel containing plural sub-carriers and each sub-carrier being modulated with a modulation scheme that encodes at least 4 bits per symbol.

According to another aspect of the present invention, there is provided a TETRA-compatible mobile communications system, comprising:

means for making transmissions using a four slot time-division multiple access scheme in 12.5 kHz channels, with each 12.5 kHz channel containing plural sub-carriers and each sub-carrier being modulated with a modulation scheme that encodes at least 4 bits per symbol.

As will be appreciated by those skilled in the art, these embodiments and aspects of the present invention can and preferably do include any one or more or all of the preferred and optional features of the invention described herein, as appropriate.

It is envisaged that the present invention may operate as a standalone "narrow band" TETRA-compatible system simply operating using the "narrow band" modulation scheme of the present invention. In this case the system infrastructure and mobile terminals could still be closely based on, and reuse many aspects of, existing TETRA 1 infrastructure and mobile terminals, with the only modifications needing to be made being the modifications discussed above to handle the new modulation scheme of the present invention at the physical and potentially lower MAC layer of the TETRA 1 protocol.

However, it is also envisaged that a system of the present invention could be operated simultaneously with and could coexist with a "standard" TETRA system, for example. In this case it is preferred that the system will comprise base stations that can support normal TETRA 1 25 kHz RF channels and/or TEDS 25 kHz to 150 kHz RF channels, as well as the narrow band, 12.5 kHz RF channels, of the present invention. In this case, base stations are preferably able to operate using both modulation schemes. Mobile terminals may be capable of operating only using existing TETRA 1 25 kHz channels and/or TEDS 25 kHz to 150 kHz channels, or only in the narrow band 12.5 kHz channels, or both. For example, some mobile stations are preferably able to operate in both modes and to act as gateways between the two transmission schemes, i.e. receive incoming signals on 25 kHz channels and send outgoing signals on 12.5 kHz channels, and/or vice-versa, in networks that have a mixture of 25 kHz and 12.5 kHz channels.

The system is preferably configured to be able to switch dynamically between the narrow band and TETRA operation, for example based on equipment capability and/or other factors such as quality of service. The system infrastructure could, e.g., allocate a mobile station to a narrow band channel or a normal TETRA channel, based on its knowledge of the mobile station's capability.

Thus, in a particularly preferred embodiment, it is envisaged that TETRA systems will use the modulation scheme of the present invention together with the existing π/4 DQPSK TETRA modulation and/or TEDS modulation. In other words, channels modulated with the different modulation schemes will coexist in the system. Such an arrangement will then support standard TETRA equipment and the "narrow band" TETRA-compatible equipment and system of the present invention at the same time, thus maintaining compatibility between the old and new system (and equipment). Such a system preferably uses the normal 25 kHz TETRA channels with existing π/4 DQPSK TETRA modulation, but also provides narrow band 12.5 kHz channels in accordance with the present invention.

Thus, the present invention also extends to hybrid radio systems comprising one or more traditional TETRA 1 mobile units operating in 25 kHz channels, and one or more mobile units of the present invention operating in 12.5 kHz channels.

Thus, according to an aspect of the present invention, there is provided a method of operating a TETRA mobile communications system, comprising:

using the TETRA π/4 DQPSK modulation scheme for transmissions in the system; and using a four slot time-division multiple access scheme in 12.5 kHz channels, with each 12.5 kHz channel containing plural sub-carriers and each sub-carrier being modulated with a modulation scheme that encodes at least 4 bits per symbol, for transmissions in the system.

According to another aspect of the present invention, there is provided a communications station for a TETRA mobile communications system, comprising:

means for making transmissions using the TETRA π/4 DQPSK modulation scheme; and means for making transmissions using a four slot time-division multiple access scheme in 12.5 kHz channels, with each 12.5 kHz channel containing plural sub-carriers and each sub-carrier being modulated with a modulation scheme that encodes at least 4 bits per symbol.

According to another aspect of the present invention, there is provided a TETRA mobile communications system, comprising:

one or more communications stations capable of making transmissions using the TETRA π/4 DQPSK modulation scheme; and one or more communications stations capable of making transmissions using a four slot time-division multiple access scheme in 12.5 kHz channels, with each 12.5 kHz channel containing plural sub-carriers and each sub-carrier being modulated with a modulation scheme that encodes at least 4 bits per symbol.

As will be appreciated by those skilled in the art, these embodiments and aspects of the present invention can and preferably do include any one or more or all of the preferred and optional features of the invention described herein, as appropriate.

In these arrangements, it is preferred that signalling on a π/4 DQPSK modulated channel is used to indicate the availability of the "narrow band" channels of the present invention, as appropriate. Thus the system preferably signals on a π/4-DQPSK modulation channel an indication that the "narrow band" modulation scheme of the present invention is available.

For example, in embodiments, a base station of the system can indicate its capabilities (e.g. its "narrow band" capability) using one of the reserved "modulation mode" and/or "bandwidth elements" in the "channel characteristics" element that is sent in the D-NWRK BROADCAST EXTENSION PDU (EN 300 392-2 clauses 18.4.1.4.1b and 18.5.5a). Alternatively, a spare value in the augmented channel allocation (EN 300 292-2 clause 21.5.2) could be used.

Equally, in embodiments, a communications terminal (mobile station) can indicate its capabilities (e.g. its "narrow band" capability) to the communications system during registration (e.g. using the U-LOCATION UPDATE PDU in the optional "class of MS" and/or "extended capabilities" information elements (as will be appreciated by those skilled in the art, there are spare (reserved) bits in the extended capabilities element (EN300 392-2 clause 16.10.10a))). Alternatively, an unused QAM bandwidth value in the extended capabilities could be used. This information can be used by the communications system to allocate an appropriate channel to the communications terminal.

Where a TETRA system supports both "normal" TETRA π/4 DQPSK modulated channels operating at 25 kHz channels and "narrow band" operation in the manner of the present invention operating in 12.5 kHz channels, respective synchronisation bursts for both modulation schemes are preferably provided, but are preferably configured and arranged such that a TETRA 1 terminal scanning for a TETRA 1 synchronisation burst will not detect the "narrow band" modulation scheme synchronisation burst, but a "narrow band" capable terminal scanning for synchronisation bursts will be able to detect both types of synchronisation burst and discriminate between the two. This will then allow a base station receiver or a mobile receiver to be able to detect whether an incoming signal is a 25 kHz channel signal or a 12.5 kHz channel signal.

The present invention also extends to apparatus for allowing a TETRA communications station (which could be a base station or a mobile station as is known in the art) to use the modulation schemes of the present invention.

As will be appreciated by those skilled in the art, all of the described aspects and embodiments of the present invention can and preferably do include any one or more or all of the preferred and optional features of the invention described herein, as appropriate.

The methods in accordance with the present invention may be implemented at least partially using software e.g. computer programs. It will thus be seen that when viewed from further aspects the present invention provides computer software specifically adapted to carry out the methods hereinabove described when installed on data processing means, and a computer program element comprising computer software code portions for performing the methods hereinabove described when the program element is run on data processing means. The invention also extends to a computer software carrier comprising such software which when used to operate a communications system and a communications station comprising data processing means causes in conjunction with said data processing means said system or station to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out hereinabove.

A number of preferred embodiments of the present invention will now be described by way of example only and with reference to the accompanying drawings, in which:

FIG. 3 illustrates the structure of a frame for use in a preferred embodiment of the present invention;

Figures 5, 6:
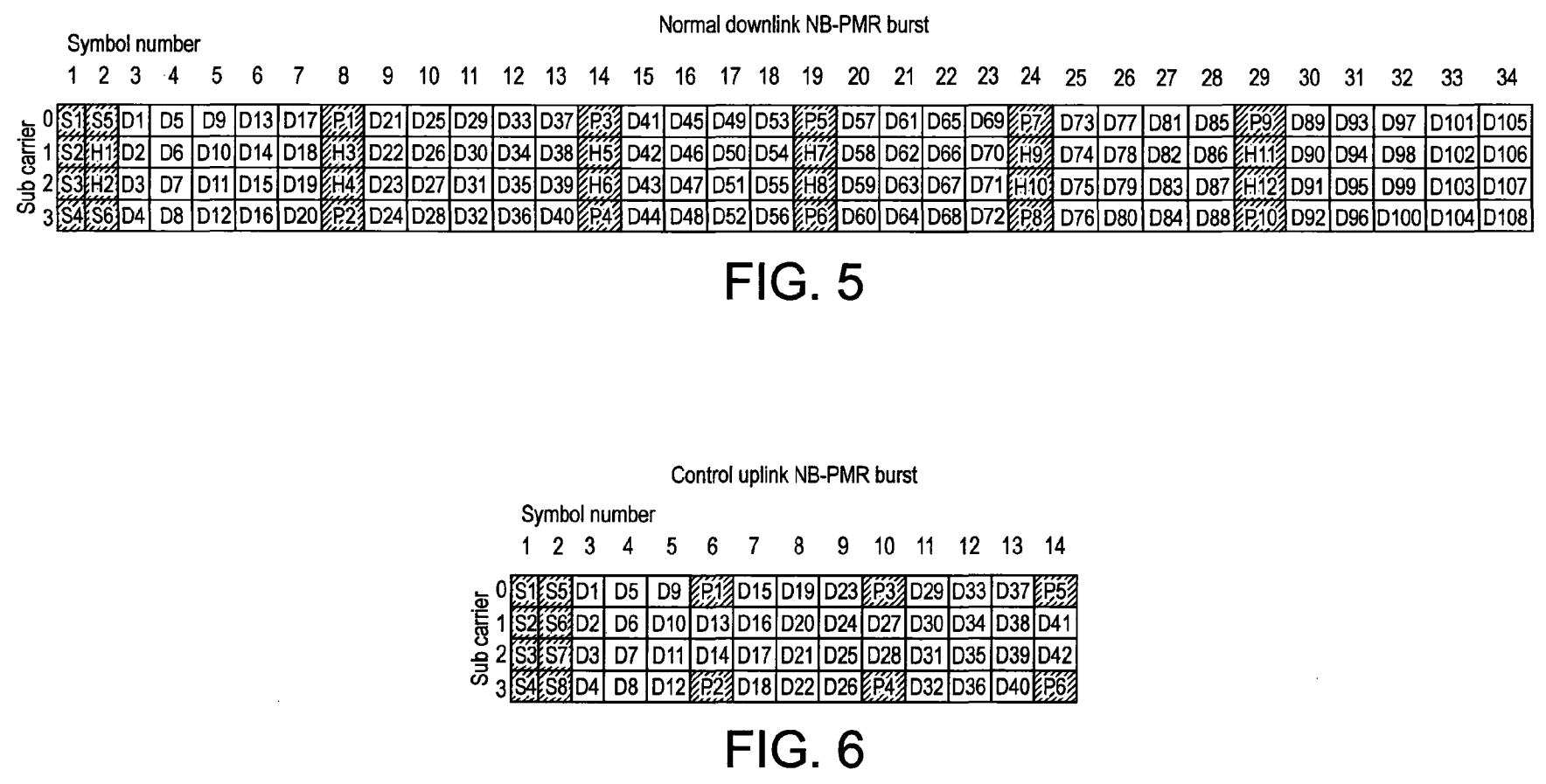

FIGS. 4-7 show preferred embodiments of the normal uplink burst structure (FIG. 4), the normal downlink burst structure (FIG. 5), the control uplink burst structure (FIG. 6), and the downlink synchronisation burst structure (FIG. 7), to be used in preferred embodiments of the present invention;

FIG. 8 shows a preferred embodiment of a DMO synchronisation burst structure to be used in preferred embodiments of the present invention;

A preferred embodiment of the present invention will now be described with particular reference to a narrow band TETRA-compatible mobile communications system in which 12.5 kHz channels are used for transmission. However, as will be appreciated, the present invention is not exclusively limited to such an arrangement and will be applicable to other radio Standards and systems.

For convenience, the narrow band communication scheme of the present embodiment will be referred to as NB-PMR.

Figure 1:
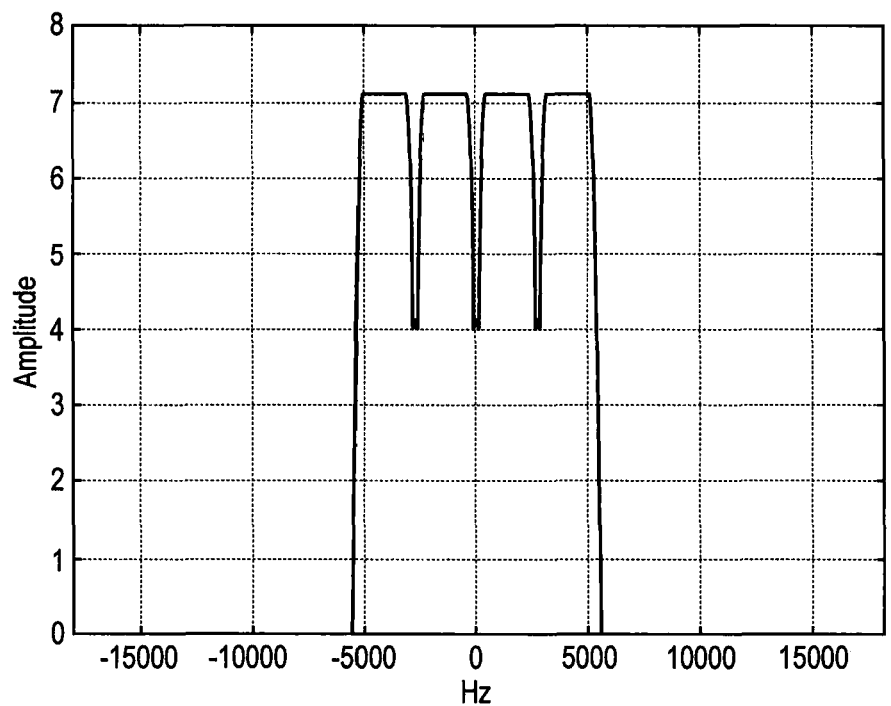
FIG. 1 shows an exemplary spectrum of a single 12.5 kHz channel for a preferred embodiment of a narrow band mobile communications system in accordance with the present invention.

FIG. 1 shows an exemplary spectrum of a single 12.5 kHz channel that is used in this embodiment of the present invention. While FIG. 1 illustrates a spectrum for one such channel, it will be appreciated that in practice preferably plural 12.5 kHz channels are provided (supported) and used.

According to this embodiment, and as shown in FIG. 1, each 12.5 kHz channel carries (is divided into) four equally spaced sub-carriers, having a spacing of 2.7 kHz. The modulation scheme uses 2400 symbols per second, and an RRC modulation filter with alpha=0.2. Accordingly, the nominal overall modulation bandwidth provided within the 12.5 kHz channel is 10.8 kHz.

Figure 2:
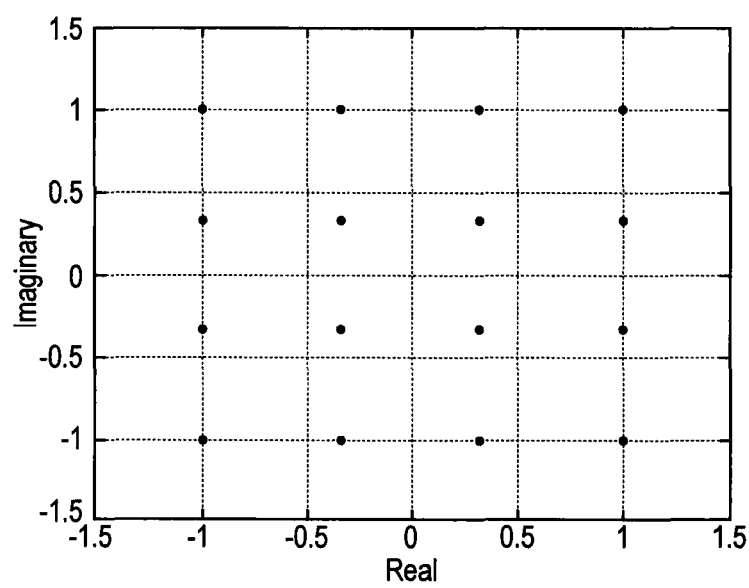
FIG. 2 shows the symbol constellation diagram for a modulation scheme in accordance with a preferred embodiment of the present invention.

A 16-QAM modulation scheme is used to modulate the data and header symbols on each respective sub-carrier in the 12.5 kHz channel. FIG. 2 shows the symbol constellation diagram for the 16-QAM modulation scheme which is used in this embodiment of the present invention. This modulation scheme encodes 4-bits per-symbol. Other modulation schemes could be used, if desired.

FIG. 3 illustrates the timeslot and frame structure that is used in this preferred embodiment of the present invention. As discussed above, and as shown in FIG. 3, a four-slot TDMA arrangement, having the timing structure of TETRA 1 is used. Thus, each frame has four timeslots (shown as Slots 1 to 4), each time-slot is 14.17 ms long, and each frame is 56.7 ms long. Also, as shown in FIG. 3, the arrangement is such that each timeslot contains 34 (NB-PMR) symbols per-sub-carrier. This facilitates compatibility with TETRA 1 systems whose time slot and frame structure is also shown in FIG. 3 for comparison purposes.

In this arrangement, using the 16-QAM modulation scheme in a timeslot having the TETRA 1 timing structure and containing 34 symbols per sub-carrier, provides 4×34=136 bits per sub-carrier per timeslot, and so can be used to provide 544 bits (4×136) per timeslot where 4 sub-carriers (each carrying 34 16-QAM symbols) are being used. This bit capacity can be used to provide a system that is compatible with TETRA 1.

As well as the above modulation scheme and sub-carrier arrangement, etc., the present embodiment also uses particular burst structures for its transmissions when operating in the 12.5 kHz channels. FIGS. 4-8 show the burst structures that are used in the present embodiment.

FIGS. 4-7 show the normal uplink burst structure (FIG. 4), the normal downlink burst structure (FIG. 5), the control uplink burst structure (FIG. 6), and the downlink synchronisation burst structure (FIG. 7), used in this embodiment of the present invention.

Figures 7, 8:
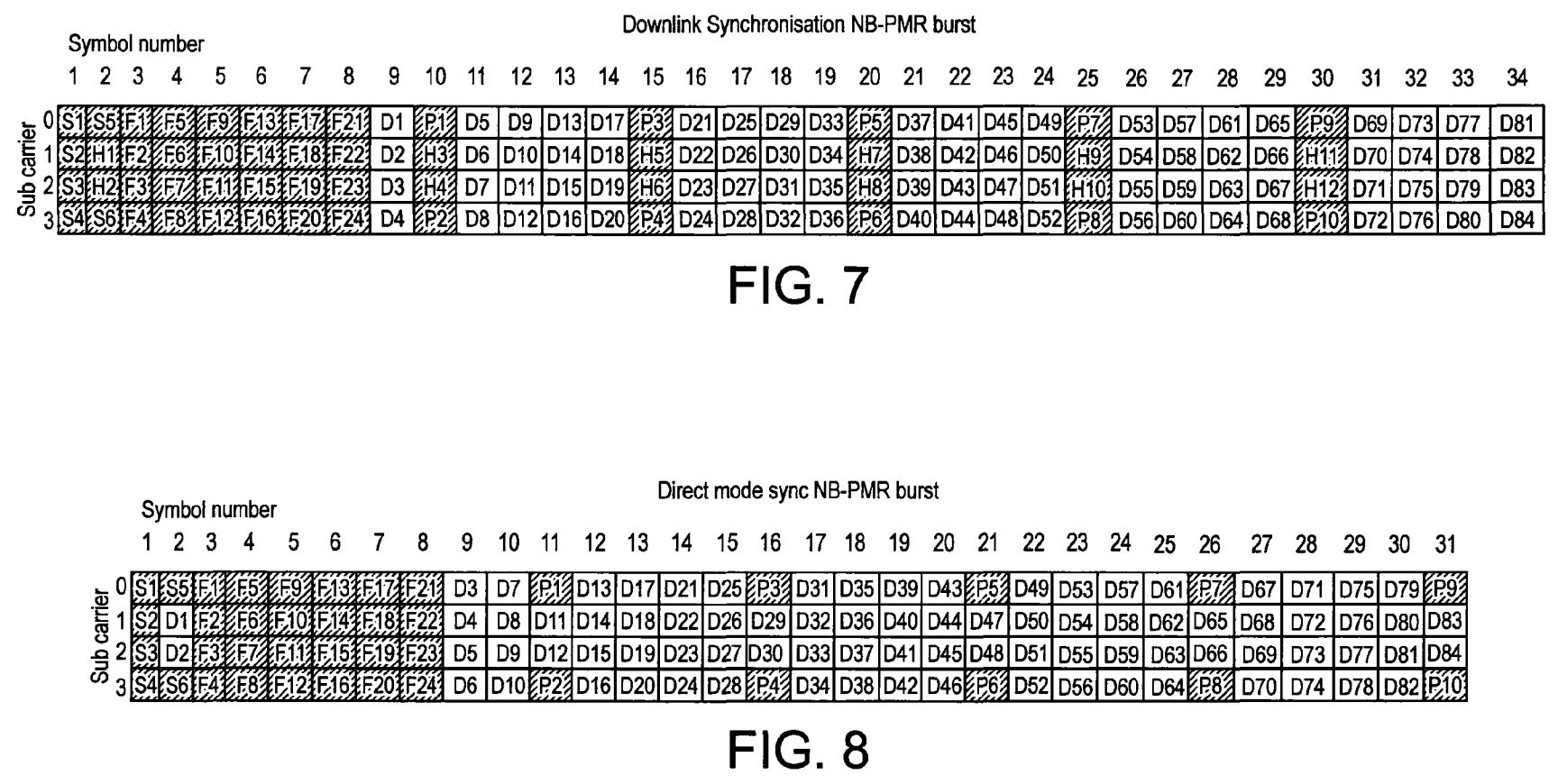

FIG. 8 shows the DMO (Direct Mode Operation) synchronisation burst structure which is used in this embodiment of the present invention for synchronising in DMO. Direct mode operation also uses a DMO normal burst structure that has the same structure as the normal uplink burst for the trunked mode operation shown in FIG. 4.

In FIGS. 4-8, the various symbols depicted comprise data symbols (labelled D) (from the 16-QAM symbol constellation), frequency correction symbols (labelled F) (from a frequency correction symbol constellation), header symbols (labelled H) (from the 16-QAM symbol constellation), pilot symbols (labelled P) (from a pilot symbol constellation), and synchronisation symbols (labelled S) (from a synchronisation symbol constellation).

These burst structures have been designed to allow the four sub-carrier modulation scheme having the symbol duration and slot duration described above (i.e. providing a total of 136 (4×34) symbols per timeslot) (and thus 544 bits per timeslot) (with four bits per symbol) (on the downlink) of the present embodiment to provide sufficient capacity to support TETRA 1 compatible payloads which require 432 bits per timeslot, and an additional 30 bits for the AACH channel on the downlink, whilst still allocating a number of symbols in each slot as synchronisation symbols and as pilot symbols in order to support synchronisation and channel equalisation, etc.

(The equivalent uplink capacity, allowing for ramp-up and down periods, is 124 symbols per timeslot (i.e. 4×31 symbols per timeslot), or 496 bits per timeslot.)

Thus, the burst structures of this embodiment can be used to achieve payload capacities that are sufficient for compatibility with TETRA 1.

Other burst structures would be possible, if desired.

The present embodiment of the present invention also uses particular (and identifiable) logical channels for transmission (as is conventional in mobile communications systems), so as to, e.g., allow particular forms (types) of transmissions to be readily identified and processed. In the present embodiment, logical channels corresponding to the TETRA 1 logical channels shown in the table below are used and supported. These logical channels are mapped onto bursts as set out in the table below.

| TETRA 1 Logical Channel | TETRA 1 Forward Error Correction (FEC) and Error Detection and Correction (EDC) | NB-PMR FEC |
| --- | --- | --- |
| AACH | TETRA 1 (14, 30) Reed-Muller FEC. Mapped to broadcast block in TETRA 1 downlink bursts. | FEC: As TETRA 1, or TEDS 3x(5, 16) Reed-Muller FEC. Mapped onto the 12 Header symbols in downlink bursts (NDB, DSB). 48 bits available in 12 * 4 16-QAM header symbols. |
| BSCH | Rate 2/3 RCPC + 16 bit CRC. Mapped to Block 1 of synchronisation bursts in TETRA 1. | FEC: As TETRA 1 or replace R2/3 RCPC with Turbo code. Mapped to 30 data symbols in the NB-PMR sync burst. (120 data bits). |
| TCH/7.2 | Uncoded traffic channel, no FEC, only scrambling. Mapped to Block 1 and Block 2 of NDB and NUB. | FEC: As TETRA 1. Mapped to 108 data symbols in NB-PMR NDB and NUB. (432 bits). |
| TCH/4.8 | Rate 2/3 RCPC coded channel with 4 bit termination. Mapped to Block 1 and Block 2 of NDB and NUB. | FEC: As TETRA 1, or use 3 bit terminated r2/3 Turbo code. Mapped to 108 data symbols in NB-PMR NDB and NUB. (432 bits). |
| TCH/2.4 | Rate 1/3 RCPC coded channel with 4 bit termination Mapped to Block 1 and Block 2 of NDB and NUB. | FEC: As TETRA 1, or use r1/2 Turbo code or concatenated code for rate 1/3. (Rate 1/3 Turbo code could be used). Mapped to 108 data symbols in NB-PMR NDB and NUB. (432 bits). |
| SCH/HD, BNCH, | Rate 2/3 RCPC coded channel with 4 bit termination. | FEC: As TETRA 1, or replace with r2/3 Turbo code. |
| SCH/HU | Rate 2/3 RCPC coded channel with 4 bit termination. Mapped to CB. | FEC: As TETRA 1, or replace with r2/3 Turbo code. Mapped to CB data symbols. |
| SCH/F | Rate 2/3 RCPC coded channel with 4 bit termination. Mapped to Block 1 and Block 2 of NDB and NUB. | As TETRA 1, or use r2/3 Turbo code. Mapped to 108 data symbols in NB-PMR NDB and NUB. (432 bits). |
| TCH/S | Multi-rate RCPC coded channel optimised for speech codec. Half and full slot. Mapped to Block 1 and Block 2 for full slot speech traffic, or Block 1 or Block 2 for half slot. | FEC: As TETRA 1, or replace with Turbo code. Mapped to 108 data symbols in NB-PMR NDB and NUB. (432 bits) for full slot, or 54 data symbols for half slot. |

Other arrangements would, of course, be possible.

The present embodiment uses a layered protocol arrangement for its protocol as is conventional in mobile communications systems. The table below sets out the layer protocol arrangement that is used in the present embodiment in terms of the changes made to the TETRA 1 layered protocol arrangement, and with reference to the ISO 7 layer protocol model. In this embodiment, only layer 1 (i.e. the "physical layer") and the Lower MAC layer of layer 2 (i.e. of the "data link layer") are changed with respect to the protocol layers of the TETRA (TETRA 1) system. Protocol layers above the Lower MAC layer (i.e. the Upper MAC layer and above) are the same as in (i.e. not changed with respect to) TETRA 1.

| Layer | ISO 7 layer protocol model | Approximate equivalent TETRA 1 protocol name/function | Changes |
|---|---|---|---|
| 7 | Application layer | Application layer, speech codec | No change |
| 6 | Presentation layer | E2E encryption | No change |
| 5 | Session layer | | No change |
| 4 | Transport layer | | No change |
| 3 | Network layer | MM, CMCE, PD MLE | No change |
| 2 | Data link layer | LLC | No change |
| | | Upper MAC | No change |
| | | Lower MAC | Some change |
| 1 | Physical layer | Physical layer | Change |

Figure 9:
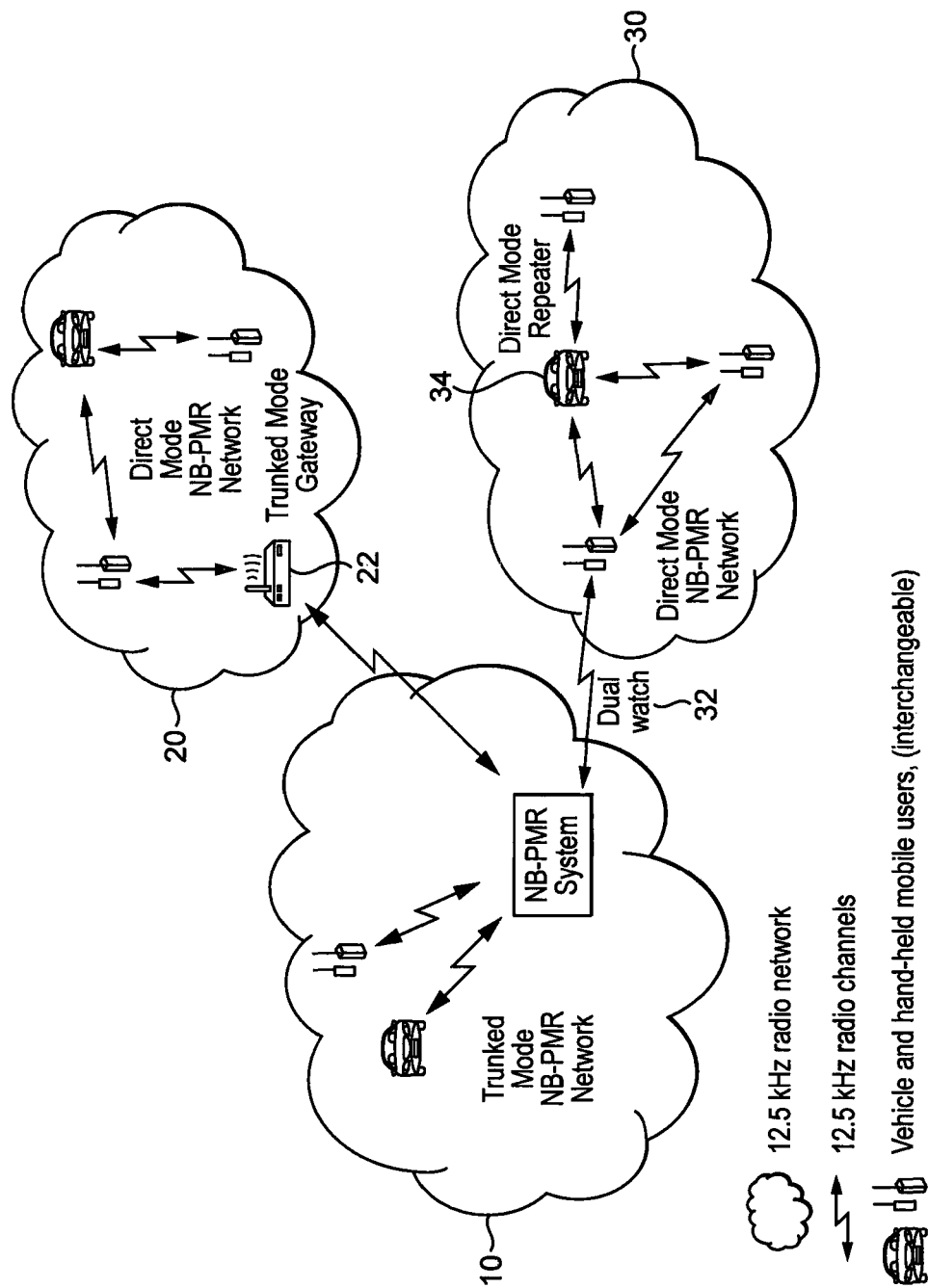
FIG. 9 shows a schematic diagram of an exemplary hybrid mobile communications system in accordance with an embodiment of the present invention.

The system of the present embodiment may be used, for example, to provide a standalone, narrow-band mobile communications system. FIG. 9 shows a schematic diagram of an exemplary such narrow band Private Mobile Radio (NB-PMR) TETRA-compatible mobile communications system in which 12.5 kHz channels are used for transmission in accordance with this preferred embodiment of the present invention. In FIG. 9, the arrowed lines indicate 12.5 kHz channels. Also shown are vehicle and hand-held communications terminals (which are interchangeable). The system includes one or more base stations and infrastructure elements which form a 12.5 kHz trunked mode network 10, as is conventional in mobile communications systems.

FIG. 9 also shows Direct Mode Operation, with 12.5 kHz direct mode networks 20, 30 which allow communications terminals to operate in direct mode with each other, and to communicate with the trunked mode network 10 via a trunked mode gateway 22 and/or a dual watch mobile station 32. One or more direct mode repeaters 34 may be provided in the system to extend the range of communication between communications terminals operating in direct mode.

It is also envisaged that the scheme of the present invention can be used in conjunction with existing and conventional TETRA networks.

Figure 10:
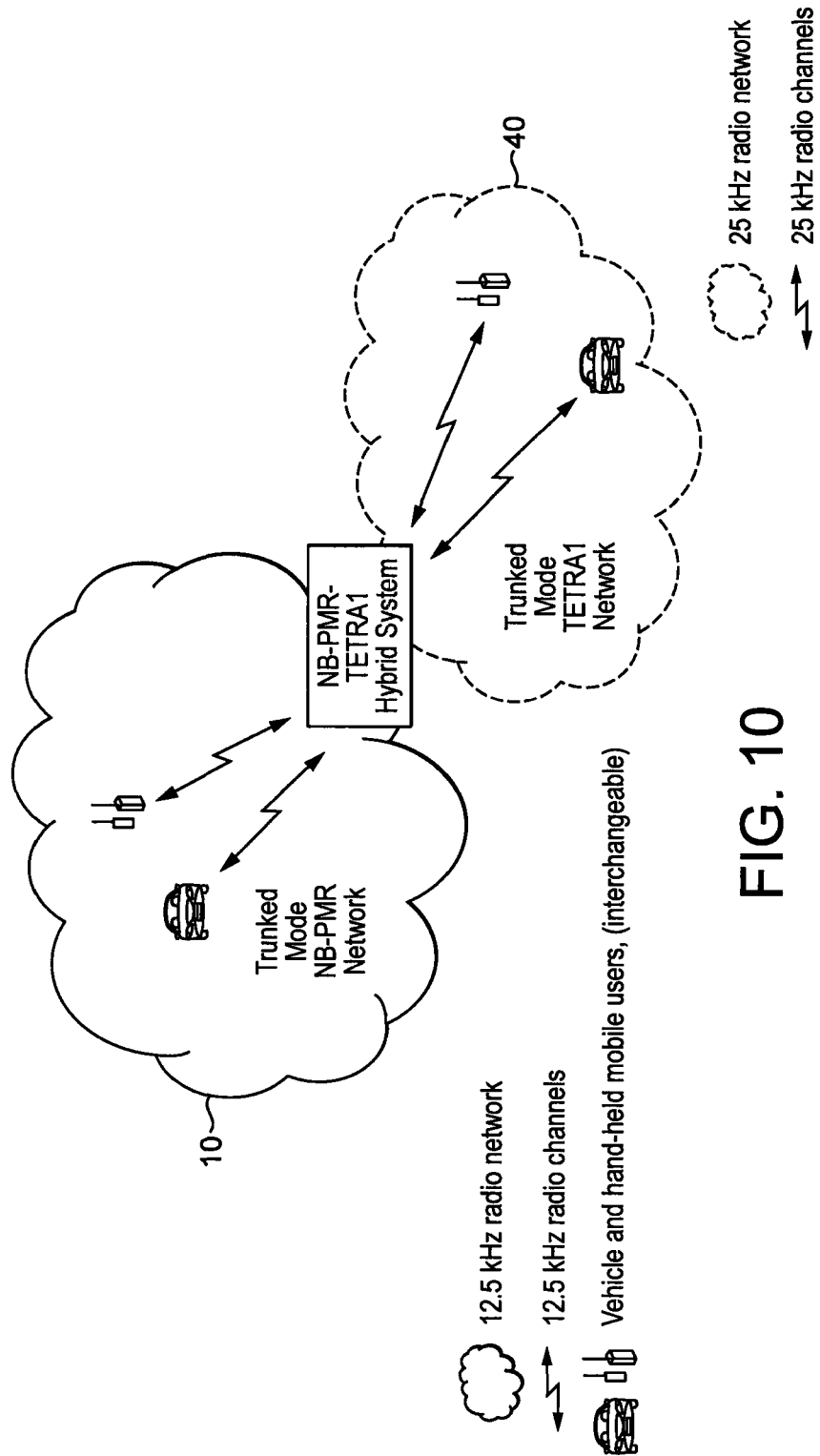
FIG. 10 shows a schematic diagram of an exemplary hybrid mobile communications system in accordance with an embodiment of the present invention.

FIG. 10 shows a schematic diagram of a trunked mode network for an exemplary hybrid mobile communications system in which both 12.5 kHz NB-PMR channels in the manner of the above embodiment and 25 kHz TETRA 1 channels are used for transmission (are supported). Vehicle and hand-held communications terminals are shown (which are interchangeable).

This exemplary hybrid system comprises a TETRA 1 trunked mode network 40 which comprises users (communications terminals) that operate using conventional 25 kHz channels, and a NB-PMR trunked mode network 10 which comprises users (communications terminals) that operate using 12.5 kHz channels in the manner of the above embodiment. Users (communications terminals) that operate using 25 kHz channels, can preferably interoperate with users (communications terminals) that operate using 12.5 kHz channels via the hybrid system. Preferably, the hybrid system comprises base stations that can support both 12.5 kHz and 25 kHz channels.

Preferably, the hybrid system is able to switch dynamically between operating using 12.5 kHz channels for transmission and using 25 kHz channels for transmission based on the capabilities of the (e.g.) communications terminals in the system and/or the quality of the signal. Preferably, the hybrid system can allocate 25 kHz channels to communications terminals operating using 25 kHz channels (e.g. conventional TETRA 1 communication terminals), and can allocate 12.5 k Hz channels to communications terminals operating using 12.5 kHz channels (e.g. NB-PMR communication terminals).

In a preferred embodiment, the allocation is based on protocol elements in the control channel and/or characteristics of the modulation being used. For example, a communications terminal (mobile station) can indicate its capabilities (e.g. its "narrow band" capability) to the communications system during registration (e.g. using the U-LOCATION UPDATE PDU in the optional "class of MS" and/or "extended capabilities" information elements (as will be appreciated by those skilled in the art, there are spare (reserved) bits in the extended capabilities element (EN300 392-2 clause 16.10.10a))). Alternatively, an unused QAM bandwidth value in the extended capabilities may be used. This information can be used by the communications system to allocate an appropriate channel to the communications terminal.

Equally, the communications terminals used in the hybrid system are preferably able to operate using 25 kHz channels or using 12.5 kHz channels as required at any given time. The communications terminals can be configured such that if they detect 12.5 kHz transmissions, they preferably switch to operate using a 12.5 kHz channel, and if they detect 25 kHz TETRA 1 transmission, they preferably switch to operate using a 25 kHz (TETRA 1) channel.

For example, a base station of the system can indicate the bandwidth of a channel using one of the reserved "modulation mode" and/or "bandwidth elements" in the "channel characteristics" element that is sent in the D-NWRK BROADCAST EXTENSION PDU (EN 300 392-2 clauses 18.4.1.4.1b and 18.5.5a). Alternatively, a spare value in the augmented channel allocation (EN 300 292-2 clause 21.5.2) can be used. This information can be used by the communications to terminal to switch between the two modes of operation.

Similarly, a TETRA system with a mobile station on a 25 kHz π/4-DQPSK MCCH could allocate the mobile station to a 12.5 kHz assigned channel, and/or a mobile station on a 12.5 kHz MCCH could be allocated to a TETRA 25 kHz π/4-DQPSK assigned channel (or a QAM assigned channel).

Figure 11:
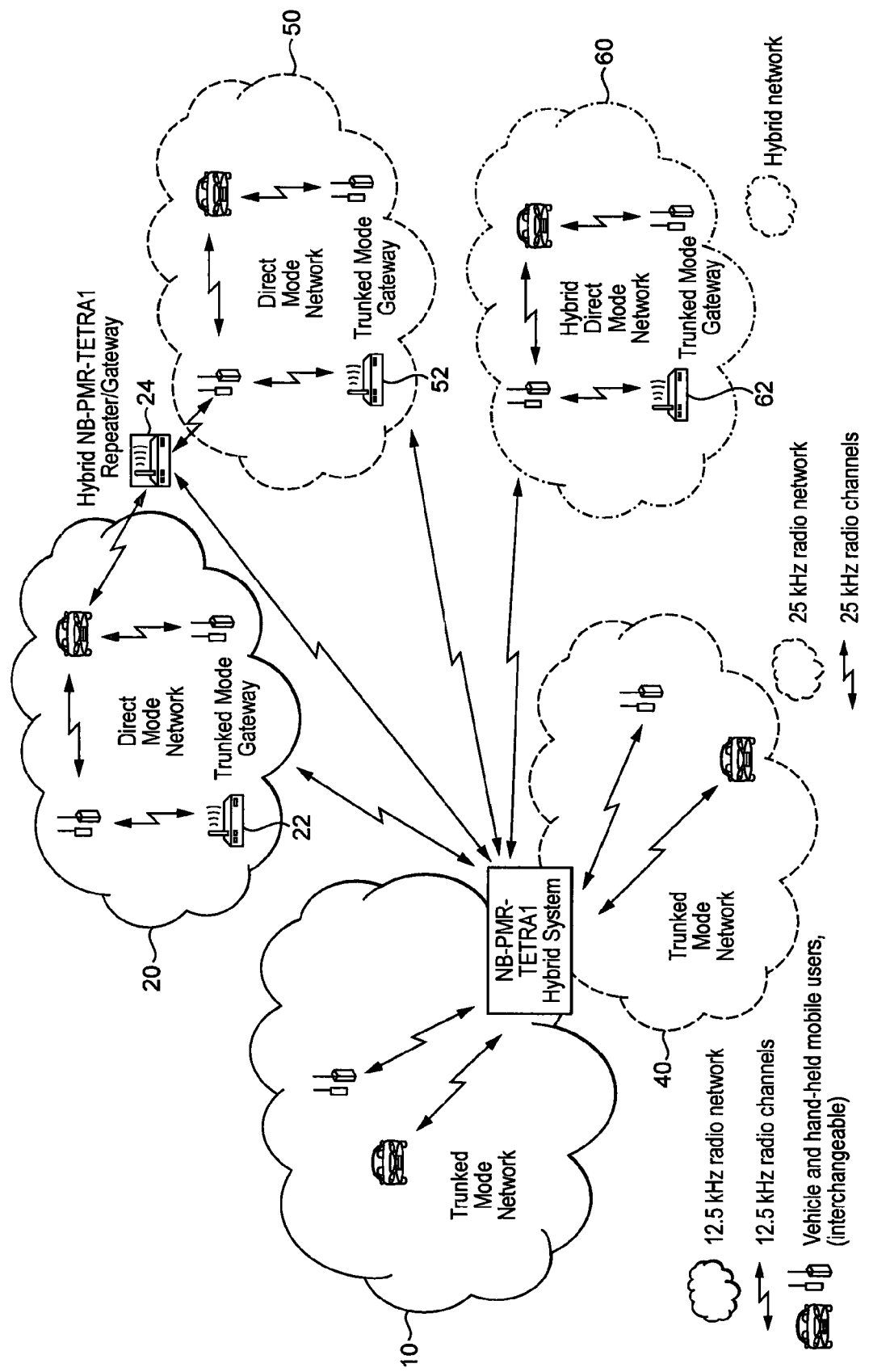
FIG. 11 shows a schematic diagram of another exemplary hybrid mobile communications system in accordance with an embodiment of the present invention.

FIG. 11 shows a schematic diagram of another exemplary hybrid mobile communications system in which both 12.5 kHz (NB-PMR) channels and 25 kHz (TETRA 1) channels can be used for transmission (are supported). Networks 10 and 40 correspond to networks 10 and 40 in FIG. 10. In this case DMO is also supported. Vehicle and hand-held communications terminals (which are interchangeable) are shown.

The hybrid mobile communications system in this embodiment preferably comprises a direct mode network 50 which can support communications terminals that operate using conventional 25 kHz channels (e.g. purely TETRA 1), a direct mode network 20 which can support communications terminals that operate using 12.5 kHz channels (e.g. purely NB-PMR), as well as a hybrid direct mode network 60 which preferably supports both communications terminals that operate using conventional 25 kHz channels and communications terminals that operate using 12.5 kHz channels (e.g. a mixture of NB-PMR and TETRA 1 users).

Preferably, gateways 22, 24, 52, 62 and/or dual watch mobile stations are provided in order to provide interoperability between the infrastructure elements. In this embodiment, gateways 22, 52 and 62 comprise trunked mode gateways and gateway 24 comprises a hybrid NB-PMR-TETRA 1 repeater or gateway. Preferably, certain communications terminals (mobile stations) are able to operate using both modulation schemes, and can act as gateways between the two modulation schemes. These mobile stations are preferably able to receive incoming signals on 25 kHz channels and send outgoing signals on 12.5 kHz channels, and vice versa.

It can be seen from the above, that the present invention, in its preferred embodiments at least, can provide a narrower band mobile communications system that still allows many or all of the functionalities of TETRA 1 to be preserved, and the changes necessary to existing TETRA equipment for it to be able to use the modulation scheme of the present invention to be relatively small. Equally, the new scheme can have a high degree of interoperability with existing TETRA systems.

The scheme of the present invention can also accordingly be used to upgrade an existing TETRA system in a way which requires no new frequencies and requires relatively minimal new equipment investment. Similarly, the invention can be employed in green field TETRA systems to enhance the basic TETRA system capability. It can also be used to allow a substantially TETRA compatible and/or TETRA-based system to be deployed in regions and frequency bands that specify 12.5 kHz, rather than 25 kHz, radio channels.

This is achieved in the preferred embodiments of the present invention at least by providing a digital mobile radio communications system that makes transmissions using a four slot time-division multiple access scheme in 12.5 kHz channels, and using a multi-carrier modulation scheme that encodes at least 4 bits per symbol.

The invention claimed is:

1. A method of operating a digital mobile radio communications system, comprising:
configuring a four slot time-division multiple access scheme with a plurality of 12.5 kHz channels, each of the plurality of the 12.5 kHz channels containing a plurality of sub-carriers and each sub-carrier being modulated with a modulation scheme that encodes at least 4 bits per symbol and that uses a fixed constant modulation level for data symbols, the four slot time division multiple access scheme further being configured to not include header symbols in uplink bursts in the scheme, for use for transmissions in the digital mobile radio communications system; and
configuring a device to use the four slot time-division multiple access scheme.

2. The method of claim 1, further comprising:
configuring a TETRA π/4 DQPSK modulation scheme for use for transmissions in the digital mobile radio communications system; and
configuring the device to dynamically switch between the 12.5 kHz four slot time-division multiple access scheme and the TETRA π/4 DQPSK modulation scheme for transmissions in the digital mobile radio communications system.

3. The method of claim 2, further comprising configuring the device to:
use the 12.5 kHz four slot time-division multiple access scheme for receiving transmissions and use the TETRA π/4 DQPSK modulation scheme for sending transmissions in the digital mobile radio communications system; or
use the 12.5 kHz four slot time-division multiple access scheme for sending transmissions and use the TETRA π/4 DQPSK modulation scheme for receiving transmissions in the digital mobile radio communications system.

4. The method of claim 1, further comprising configuring the four slot time division multiple access scheme with four sub-carriers and 34 symbols per sub-carrier in each 12.5 kHz channel.

5. The method of claim 1, wherein the modulation scheme encodes 4 bits per symbol.

6. The method of claim 1, further comprising configuring the four slot time division multiple access scheme to use the higher level protocol layers, services and applications of the TETRA 1 standard.

7. The method of claim 1, wherein the protocol layers above the Lower MAC layer of the digital mobile radio communications system are the same as in the TETRA 1 standard.

8. A method of operating a digital mobile radio communications system, comprising:
configuring a four slot time-division multiple access scheme with a plurality of 12.5 kHz channels, with each of the plurality of the 12.5 kHz channels containing a plurality of sub-carriers and each sub-carrier being modulated with a modulation scheme that encodes at least 4 bits per symbol, the four slot time division multiple access scheme further being configured to include pilot symbols only in the outer two sub-carriers of a 12.5 kHz channel, for use for transmissions in the digital mobile radio communications system; and
configuring a device to use the four slot time-division multiple access scheme.

9. A method of operating a digital mobile radio communications system, comprising:
configuring a four slot time-division multiple access scheme with a plurality of 12.5 kHz channels, with each of the plurality of 12.5 kHz channels containing a plurality of sub-carriers and each sub-carrier being modulated with a modulation scheme that encodes at least 4 bits per symbol, the four slot time division multiple access scheme further being configured to include relatively fewer synchronisation and pilot symbols in transmissions using the 12.5 kHz four slot time-division multiple access scheme than are included in transmissions using the TEDS standard, and being configured such that the ratio of synchronisation and pilot symbols to payload symbols is smaller in transmissions using the 12.5 kHz four slot time-division multiple access scheme than in transmissions using the TEDS standard, for use for transmissions in the digital mobile radio communications system; and
configuring a device to use the four slot time-division multiple access scheme.

10. A communications station for a digital mobile radio communications system, comprising:
a transmitter configured to use a four slot time-division multiple access scheme with a plurality of 12.5 kHz channels, each of the plurality of the 12.5 kHz channels containing a plurality of sub-carriers and each sub-carrier being modulated with a modulation scheme that encodes at least 4 bits per symbol and that uses a fixed constant modulation level for data symbols, the four slot time division multiple access scheme further being configured to not include header symbols in uplink bursts in the scheme, for transmissions in the digital mobile radio communications system.

11. The station of claim 10, wherein the transmitter is further configured to:
dynamically switch between making transmissions using the 12.5 kHz four slot time-division multiple access scheme and making transmissions using a TETRA π/4 DQPSK modulation scheme.

12. The station of claim 11, wherein the station is configured:
to receive 12.5 kHz four slot time-division multiple access scheme transmissions and to send transmissions using the TETRA π/4 DQPSK modulation scheme; or
to receive TETRA π/4 DQPSK transmissions and to send transmissions using the 12.5 kHz four slot time-division multiple access scheme.

13. The station of claim 10, wherein each 12.5 kHz channel comprises four sub-carriers with 34 symbols per sub-carrier.

14. The station of claim 10, wherein the modulation scheme encodes 4 bits per symbol.

15. The station of claim 10, wherein the higher level protocol layers, services and applications are the same as in the TETRA 1 standard.

16. The station of claim 10, wherein the protocol layers above the Lower MAC layer are the same as in the TETRA 1 standard.

17. A digital mobile radio communications system, comprising: a transmitter configured to use a four slot time-division multiple access scheme with a plurality of 12.5 kHz channels, each of the plurality of the 12.5 kHz channels containing a plurality of sub-carriers and each sub-carrier being modulated with a modulation scheme that encodes at least 4 bits per symbol and that uses a fixed constant modulation level for data symbols, the four slot time division multiple access scheme further being configured to not include header symbols in uplink bursts in the scheme, for transmissions in the digital mobile radio communications system.

18. A communications station for a digital mobile radio communications system, comprising:
a transmitter configured to use a four slot time-division multiple access scheme with a plurality of 12.5 kHz channels, with each of the plurality of 12.5 kHz channels containing a plurality of sub-carriers and each sub-carrier being modulated with a modulation scheme that encodes at least 4 bits per symbol, the four slot time division multiple access scheme further being configured to include pilot symbols only in the outer two sub-carriers of a 12.5 kHz channel, for transmissions in the digital mobile radio communications system.

19. A communications station for a digital mobile radio communications system, comprising:
a transmitter configured to use a four slot time-division multiple access scheme with a plurality of 12.5 kHz channels, with each of the plurality of 12.5 kHz channels containing a plurality of sub-carriers and each sub-carrier being modulated with a modulation scheme that encodes at least 4 bits per symbol, the four slot time division multiple access scheme further being configured to include relatively fewer synchronisation and pilot symbols in transmissions using the 12.5 kHz four slot time-division multiple access scheme than are used in transmissions using the TEDS standard, and being configured such that the ratio of synchronisation and pilot symbols to payload symbols is smaller in transmissions using the 12.5 kHz four slot time-division multiple access scheme than in transmissions using the TEDS standard, for transmissions in the digital mobile radio communications system.

20. A non-transitory computer program element comprising computer software code portions which when run on a data processor performs a method of operating a digital mobile radio communications system, comprising:
configuring a four slot time-division multiple access scheme with a plurality of 12.5 kHz channels, each of the plurality of the 12.5 kHz channels containing a plurality of sub-carriers and each sub-carrier being modulated with a modulation scheme that encodes at least 4 bits per symbol and that uses a fixed constant modulation level for data symbols, the four slot time division multiple access scheme further being configured to not include header symbols in uplink bursts in the scheme, for use for transmissions in the system digital mobile radio communications; and
configuring a device to use the four slot time-division multiple access scheme.

21. A digital mobile radio communications system, comprising:
a transmitter configured to use a four slot time-division multiple access scheme with a plurality of 12.5 kHz channels, with each of the plurality of the 12.5 kHz channels containing a plurality of sub-carriers and each sub-carrier being modulated with a modulation scheme that encodes at least 4 bits per symbol, the four slot time division multiple access scheme further being configured to include pilot symbols only in the outer two sub-carriers of a 12.5 kHz channel, for transmissions in the digital mobile radio communications system.

22. A digital mobile radio communications system, comprising: a transmitter configured to use a four slot time-division multiple access scheme with a plurality of 12.5 kHz channels, with each of the plurality of the 12.5 kHz channels containing a plurality of sub-carriers and each sub-carrier being modulated with a modulation scheme that encodes at least 4 bits per symbol, the four slot time division multiple access scheme further being configured to include relatively fewer synchronisation and pilot symbols in transmissions using the 12.5 kHz four slot time-division multiple access scheme than are used in transmissions using the TEDS standard, and being configured such that the ratio of synchronisation and pilot symbols to payload symbols is smaller in transmissions using the 12.5 kHz four slot time-division multiple access scheme than in transmissions using the TEDS standard, for transmissions in the digital mobile radio communications system.

23. A non-transitory computer program element comprising computer software code portions which when run on a data processor performs a method of operating a digital mobile radio communications system, comprising:
configuring a four slot time-division multiple access scheme with a plurality of 12.5 kHz channels, with each of the plurality of the 12.5 kHz channels containing a plurality of sub-carriers and each sub-carrier being modulated with a modulation scheme that encodes at least 4 bits per symbol, the four slot time division multiple access scheme further being configured to include pilot symbols only in the outer two sub-carriers of a 12.5 kHz channel, for use for transmissions in the digital mobile radio communications system; and
configuring a device to use the four slot time-division multiple access scheme.

24. A non-transitory computer program element comprising computer software code portions which when run on a data processor performs a method of operating a digital mobile radio communications system, comprising:
configuring a four slot time-division multiple access scheme with a plurality of 12.5 kHz channels, with each of the plurality of 12.5 kHz channels containing a plurality of sub-carriers and each sub-carrier being modulated with a modulation scheme that encodes at least 4 bits per symbol, the four slot time division multiple access scheme further being configured to include relatively fewer synchronisation and pilot symbols in transmissions using the 12.5 kHz four slot time-division multiple access scheme than are included in transmissions using the TEDS standard, and being configured such that the ratio of synchronisation and pilot symbols to payload symbols is smaller in transmissions using the 12.5 kHz four slot time-division multiple access scheme than in transmissions using the TEDS standard, for use for transmissions in the digital mobile radio communications system; and
configuring a device to use the four slot time-division multiple access scheme.

* * * * *